United States Patent Office 3,784,644
Patented Jan. 8, 1974

3,784,644
PROCESS FOR PREPARING FLUOROPERHALO-
ALKYLIDENE IMINES
Bryce C. Oxenrider, Florham Park, Wilhelmus M.
Beyleveld, Whippany, and Cyril Woolf, Morristown,
N.J., assignors to Allied Chemical Corporation, New
York, N.Y.
No Drawing. Filed Feb. 26, 1970, Ser. No. 14,653
Int. Cl. C07c 119/00
U.S. Cl. 260—566 R 9 Claims

ABSTRACT OF THE DISCLOSURE

Fluoroperhaloalkylidene imines having the formula $Y_1Y_2C=NH$, wherein $Y_1$ and $Y_2$ are fluorine or fluoroperhaloalkyl radicals, are prepared by hydrolyzing the corresponding fluoroperhaloalkyl isocyanate having the formula $Y_1Y_2FCNCO$ with water in the form of a hydrate such as hexafluoroacetone monohydrate. The fluoroperhaloalkylidene imines are useful as intermediates in the preparation of other fluorinated compounds.

BACKGROUND OF THE INVENTION

This invention relates to a process for preparing fluoroperhaloalkylidene imines.

Fluoroperhaloalkylidene imines are known compounds. For example, U.S. Pat. 3,226,439 describes a process for preparing fluoroperhaloalkylidene imines by reacting hydrazoic acid with a fluoroperhalothioketone. According to the patent, fluoroperhaloalkylidene imines are useful in themselves and as intermediates in the preparation of products useful in biological applications. They can also be converted to gemdiamines by reaction with at least an equivalent amount of ammonium, and these diamines can be reacted with diisocyanates to form polyureas, or they can be reacted with dicarboxylic acids to form polyamides.

Another method for preparing fluoroalkylidene imines is described in an article by Middleton and Krespan appearing in vol. 30 of the Journal of Organic Chemistry at page 1398. According to this method, a fluorinated ketone is reacted with ammonia and then phosphorous oxychloride in the presence of a base such as pyridine to form the corresponding fluorinated imine.

It is an object of this invention to provide an improved method for preparing fluoroperhaloalkylidene imines.

SUMMARY OF THE INVENTION

In accordance with this invention, fluoroperhaloalkylidene imines having the formula

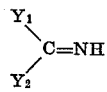

wherein $Y_1$ and $Y_2$ are independently selected from the group consisting of fluorine and fluoroperhaloalkyl radicals having the formula $CF_2X(CFX)_m$— wherein X is fluorine, chlorine or bromine and $m$ is 0 to 6, and fluoroperhalocycloalkyl radicals having the formula

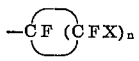

wherein X is fluorine, chlorine or bromine and $n$ is 3 to 5, are prepared by hydrolyzing a fluoroperhaloalkyl isocyanate having the formula

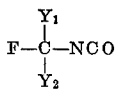

wherein $Y_1$ and $Y_2$ are as defined above, with water in the form of a hydrate, as represented by the following equation:

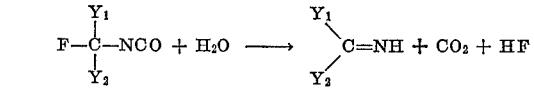

"$H_2O$" is used to indicate water in the above equation with the understanding that it is essential that the water be present in the form of a suitable hydrate.

As used herein, the term "hydrate" refers to a complex of water and another substance in which the water is chemically bound to the other substance in a definite molar ratio. The substance can be either organic or inorganic. Suitable organic hydrates include the hydrates of chlorofluoroacetones, chloral hydrate and trifluoroacetic acid hydrate. Suitable inorganic hydrates include inorganic salts containing water of crystallization. Sulfuric acid and phosphoric acid also form suitable hydrates. Hexafluoroacetone monohydrate and sesquihydrate are particularly suitable, with hexafluoroacetone monohydrate being preferred.

The fluoroperhaloalkyl isocyanate reactants are known compounds, being described, for example, in U.S. Pats. 2,617,817 and 3,118,923 and in our copending application Ser. No. 14,652, filed concurrently herewith.

In the preferred embodiments of this invention, $Y_1$ and $Y_2$ are independently selected from the group consisting of fluorine and fluoroperhaloalkyl radicals having the formula $CF_2X(CFX)_m$— wherein X is fluorine or chlorine and $m$ is 0 to 3. X is preferably fluorine. Especially good results are obtained when the fluoroperhaloalkyl isocyanate reactant is heptafluoroisopropyl isocyanate or monochlorohexafluoroisopropyl isocyanate.

Hydrolysis of the isocyanate to the imine occurs at room temperature upon addition of the hydrate. The reaction is exothermic, and in order to facilitate dissipation of the heat of reaction, it is desirable to carry out the hydrolysis in the presence of an inert liquid diluent, such as acetonitrile. However, the hydrolysis reaction can be carried out over a wide temperature range, such as from about —20° C. to about 100° C.

In order to facilitate conversion of the isocyanate to the imine, it is desirable to add to the reaction mixture a hydrogen fluoride acceptor, such as an alkali metal fluoride, ammonium fluoride or a tertiary amine.

The imine can also be prepared by passing the isocyanate as a vapor through a reaction zone containing the hydrate. By this method, the imine can be obtained in a continuous process from the reactants used to prepare the isocyanate.

The following examples further illustrate the invention. In each of the examples the fluoroperhaloalkylidene reaction product was identified by infrared spectrum analysis and by boiling point comparison.

Example 1

A three-neck, round bottom flask was fitted with a graduated dropping funnel, thermometer, stirrer, and Dry Ice head and was connected to a Dry Ice trap. The flask was charged with 11.6 grams of potassium fluoride, 100 ml. of acetonitrile, and 21.7 grams of heptafluoroisopropyl isocyanate. There was then added 19.3 grams of hexafluoroacetone sesquihydrate over a period of about 30 minutes. The reaction was exothermic, but the temperature of the reaction mixture remained at less than 40° C. After the hexafluoroacetone sesquihydrate had been added, the mixture was stirred for 3 hours at room temperature, then allowed to stand overnight under a nitrogen flush. The next morning, a small amount of liquid was observed in the trap. The Dry Ice head was replaced by a distillation head. The reaction mixture was then gradually heated over a period of about two hours to a temperature of about 78° C. At this point a total of 9.5 grams of liquid had collected in the trap. The liquid was identified as perfluoroisopropylidene imine containing only a trace amount of the isocyanate starting material.

Example 2

A three-neck, round bottom flask was equipped with a dropping funnel, thermometer, stirrer and a Dry Ice head and was connected to a Dry Ice trap. The system was flushed with dry nitrogen and charged with:

11.6 grams of anhydrous potassium fluoride,
21:1 grams heptafluoroisopropyl isocyanate, and
75 ml. of acetonitrile.

A solution of 20 grams of hexafluoroacetone monohydrate in 25 ml. of acetonitrile was added dropwise over a 10 minute period as the mixture was stirred at 20° C. Stirring was continued for 2 hours while the mixture refluxed at about 20° C. The reaction mixture was left standing overnight. The next day the mixture was heated to 80° C. and the volatile products were distilled from the reaction mixture. The products recovered consisted of 16 grams of hexafluoroacetone and 12 grams of hexafluoroisopropylidene imine.

Example 3

The procedure of Example 2 was followed except a solution of 14 grams of hexafluoroacetone monohydrate in 25 ml. of acetonitrile was added dropwise over a period of 30 minutes at 25–30° C. to a stirred mixture of:

10 grams of anhydrous potassium fluoride,
10 ml. of acetonitrile, and
20 ml. of monochlorohexafluoroisopropyl isocyanate.

The product recovered consisted of 13 grams of hexafluoroacetone and 14 grams of monochloropentafluoroisopropylidene imine.

We claim:
1. A process for preparing fluoroperhaloalkylidene imines having the formula

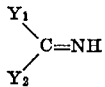

wherein $Y_1$ and $Y_2$ are independently selected from the group consisting of fluorine and fluoroperhaloalkyl radicals having the formula $CF_2X(CFX)_m$— wherein X is fluorine, chlorine or bromine and m is 0 to 6, and fluoroperhalocycloalkyl radicals having the formula

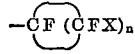

wherein X is fluorine, chlorine or bromine and n is 3 to 5, which process comprises reacting a fluoroperhaloalkyl isocyanate having the formula

wherein $Y_1$ and $Y_2$ are as defined above, with chloral hydrate, trifluoroacetic acid hydrate, hexafluoroacetone monohydrate, hexafluoroacetone sesquihydrate, or a hydrate of a chlorofluoroacetone, the reaction being carried out in the presence of a hydrogen fluoride acceptor wherein the reaction is carried out in the presence of an inert liquid diluent.

2. The process of claim 1 wherein $Y_1$ and $Y_2$ are independently selected from the group consisting of fluorine and fluoroperhaloalkyl radicals having the formula $CF_2X(CFX)_m$— wherein X is fluorine or chlorine and m is 0 to 3.

3. The process of claim 2 wherein X is fluorine.

4. The process of claim 2 wherein the fluoroperhaloalkyl isocyanate is heptafluoroisopropyl isocyanate or monochlorohexafluoroisopropyl isocyanate.

5. The process of claim 1 wherein the hydrate is hexafluoroacetone monohydrate or hexafluoroacetone sesquihydrate.

6. The process of claim 5 wherein $Y_1$ and $Y_2$ are independently selected from the group consisting of fluorine and fluoroperhaloalkyl radicals having the formula $CF_2X(CFX)_m$— wherein X is fluorine or chlorine and m is 0 to 3.

7. The process of claim 6 wherein X is fluorine.

8. The process of claim 6 wherein the fluoroperhaloalkyl isocyanate is heptafluoroisopropyl isocyanate or monochlorohexafluoroisopropyl isocyanate.

9. The process of claim 8 wherein the reaction is carried out at a temperature ranging from −20° C. to 100° C.

References Cited

UNITED STATES PATENTS

| | | | |
|---|---|---|---|
| 2,706,733 | 4/1955 | Reid | 260—583 GG X |
| 3,137,728 | 6/1964 | Reid | 260—566 D |
| 3,399,234 | 8/1968 | Zollinger | 260—566 D |

OTHER REFERENCES

Noller, "Chemistry or Organic Compounds," p. 339 (1965).

Smith, "Open Chain Nitrogen Compounds," Vol 1, p. 331 (1965).

LEON ZITVER, Primary Examiner

G. A. SCHWARTZ, Assistant Examiner

U.S. Cl. X.R.

260—566 D